United States Patent [19]

Labarre et al.

[11] Patent Number: 5,367,774
[45] Date of Patent: Nov. 29, 1994

[54] RESILIENT LOCK FOR A HAND TOOL

[75] Inventors: Ernest D. Labarre, Waunakee; Jerrold N. Austin, Baraboo, both of Wis.

[73] Assignee: Fiskars Inc., Wausau, Wis.

[21] Appl. No.: 84,791

[22] Filed: Jun. 29, 1993

[51] Int. Cl.⁵ .................. B26B 13/28; B26B 13/00
[52] U.S. Cl. ........................................ 30/262; 30/268
[58] Field of Search ................ 30/262, 266, 268, 269, 30/270; 81/318, 319, 320, 324; 411/186, 189, 155, 156, 368, 338, 339

[56] References Cited

U.S. PATENT DOCUMENTS

| | | | |
|---|---|---|---|
| 975,515 | 11/1910 | Davies | 30/269 |
| 1,785,141 | 4/1930 | Woythal | 30/268 |
| 2,041,336 | 5/1936 | Hall | 403/162 |
| 2,504,447 | 4/1950 | Polincovsky | 30/262 |
| 2,574,354 | 11/1951 | Smith | 30/262 X |
| 2,929,141 | 3/1960 | Vosbikian et al. | 30/262 X |
| 3,233,502 | 2/1966 | Fernberg | 411/500 |
| 3,235,297 | 2/1966 | Fernberg | 403/164 |
| 3,357,287 | 12/1967 | Wertepny | 81/322 |
| 3,672,053 | 6/1972 | Wiss | 30/268 X |
| 4,156,311 | 5/1979 | Wallace | 30/262 |
| 4,268,963 | 5/1981 | Harrison | 30/262 |
| 4,341,016 | 7/1982 | Harrison | 30/262 |
| 4,490,083 | 12/1984 | Rebish | 411/338 |
| 4,761,860 | 8/1988 | Krauss | 411/339 X |
| 4,947,553 | 8/1990 | Bendickson | 30/262 |
| 5,005,450 | 4/1991 | Ford | 81/318 |
| 5,033,338 | 7/1991 | Ford, Jr. | 81/318 |

FOREIGN PATENT DOCUMENTS 33580 11/1885 Germany ........................ 30/269

OTHER PUBLICATIONS

Drawings for Craftsman 71 86458 Land tool, said purchased by Examiner before Mar. 1993.

Primary Examiner—Richard K. Seidel
Assistant Examiner—Kenneth E. Peterson
Attorney, Agent, or Firm—Foley & Lardner

[57] ABSTRACT

The present invention relates to tools such as scissors, shears, pruners, and the like, which are resiliently biased to an open position, and which have a locking mechanism to keep these tools in a closed configuration. More particularly, this invention is concerned with tools having a pair of cooperatively engaging members provided with a resilient lock slidable within slots formed in these members. The lock includes a button having a yieldable head merging into a shank extending through the slots, the shank being joined to a cap. The head and cap have concavely shaped faces so that they are effectively in contact with the tool in respective annular regions of the tool, the area of these regions being proportional to the degree of compressive force applied to the lock.

14 Claims, 2 Drawing Sheets

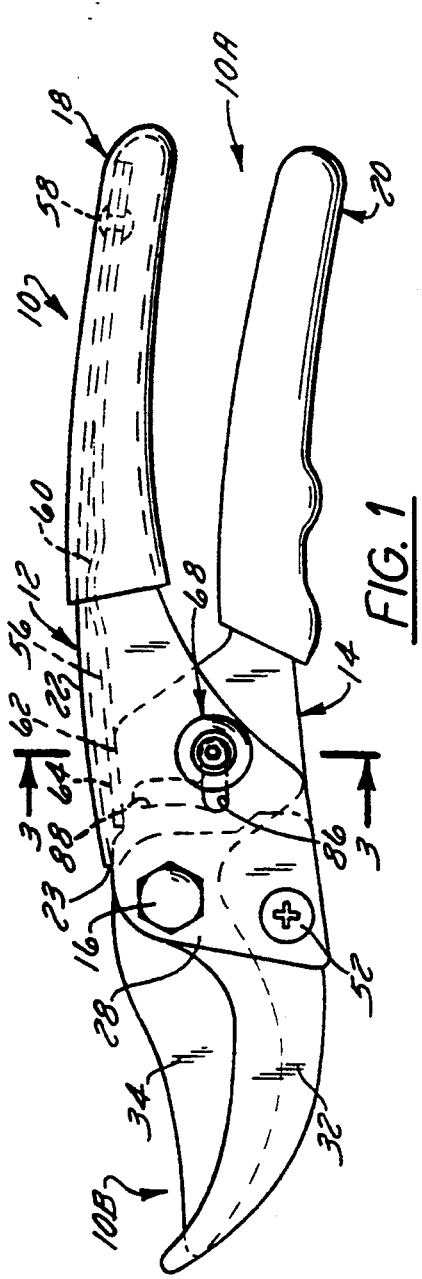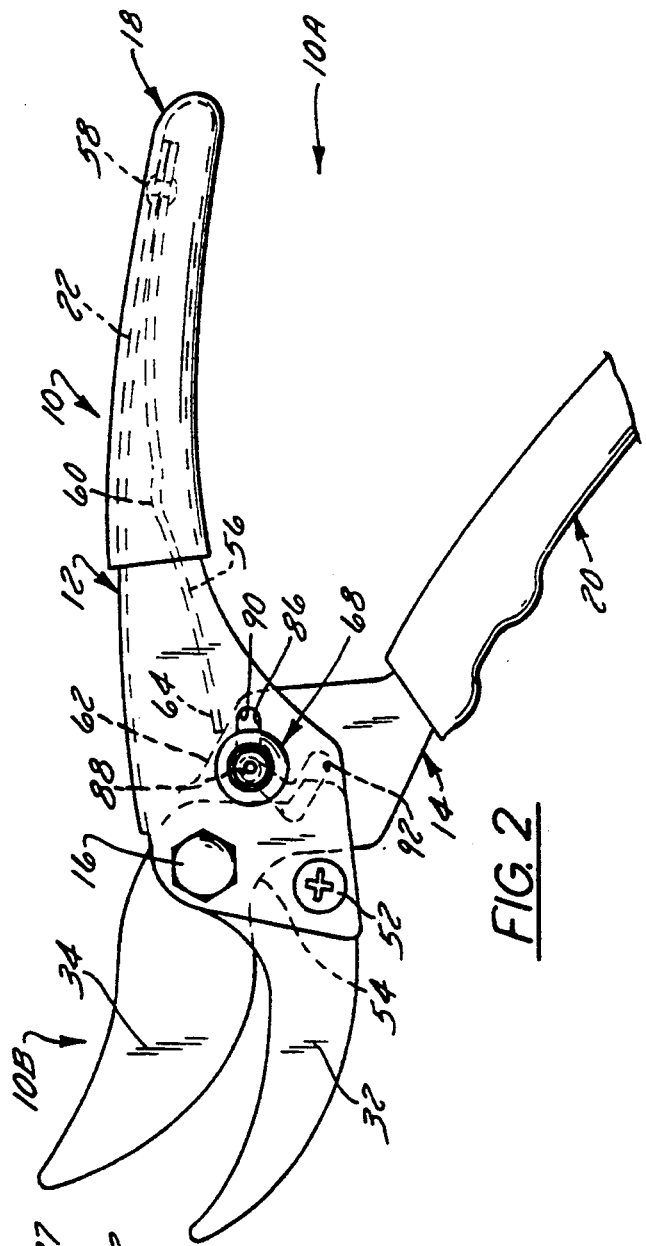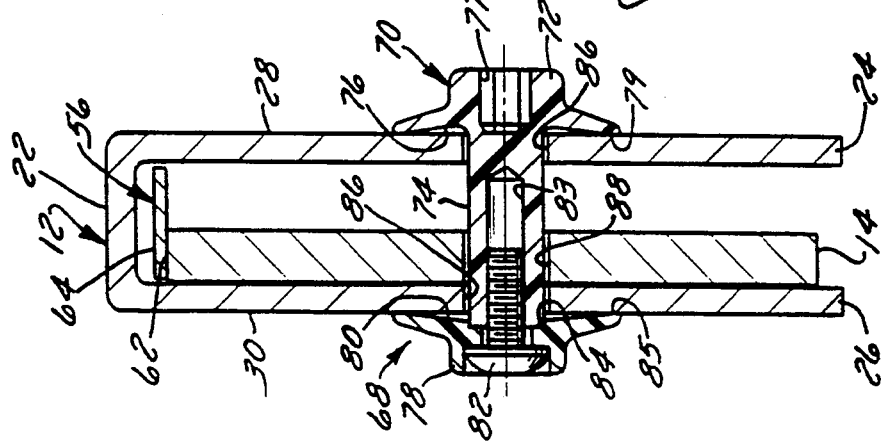

RESILIENT LOCK FOR A HAND TOOL

FIELD OF THE INVENTION

This invention relates, generally, to tools such as scissors, shears, pruners, and the like, which are resiliently biased to an open position, and which have a locking mechanism to keep these tools in a closed configuration. In particular, this invention relates to tools having an improved and simplified locking mechanism. Although it will become apparent from the following description that certain features of the present invention may be utilized in tools of various construction for application to specific uses, for ease of understanding and convenience, the following description will from time to time specifically refer to a pruning shears as the most preferred implementation of the present invention.

BACKGROUND OF THE INVENTION

It is generally known to provide hand-held garden tools such as pruning shears of the pass-by or anvil-type, wire snips, pliers, and various other cutting implements such as scissors, with a spring mechanism for urging the handles in the "open" position, thereby exposing the jaws or cutters to facilitate operation of the implement by the user. These implements typically include a lock mechanism, functioning against the action of the spring, to maintain the blades in closed position where they are least susceptible to damage and least likely to cause injury to the user when not in use.

Presently, hand-held cutters are locked in the closed position by, for example, a pivoting member secured to one of the cutting jaws, which may be pivoted into abutting relationship with the opposing jaw. Other devices employ a pivoting ratchet mechanism which can be moved from a locked to an unlocked position by the user's thumb. Examples of such pruning implements are described in U.S. Pat. No. 4,156,311, issued on May 29, 1979 to Wallace, et al.; U.S. Pat. No. 4,268,963, issued on May 26, 1981 to Harrison; and U.S. Pat. No. 4,341,016, issued Jul. 27, 1982 to Harrison, et al. As more particularly disclosed in these patents, the locking mechanism comprises a pin slidably positioned in a slot formed in one of the pivoted members to engage a recess or protrusion formed in the other member.

Other locking mechanisms comprise a spring biased stationary pin extending into a mating cavity when the tool is in closed configuration. Examples of such locking means are disclosed in U.S. Pat. No. 3,357,287 issued on Dec. 12, 1967 to Wertepny, and U.S. Pat. No. 4,947,553 issued on Aug. 14, 1990 to Bendickson et al.

It has been found, however, that latching mechanisms of the kind described in these prior art patents have various limitations. For example, certain locking mechanisms of the slidable type do not readily retain their positional adjustment, because the slidable pin tends to slide away from its selected position during normal operation of the implement and may impair normal operation of the tool. On the other hand, other mechanisms which are more reliable are of rather complex construction necessitating several parts, thereby increasing the cost of the tool, and possibly rendering these tools less durable.

Thus, it is desirable to provide an inexpensive lock mechanism for items such as pruning shears or the like which can alleviate the problems associated with conventional latch mechanisms, i.e., which provides a lock having improved positional retention properties, and which requires only a limited number of components of simple configuration to facilitate manufacturing and assembly.

SUMMARY OF THE INVENTION

The present invention provides an inexpensive lock mechanism for tools having a pair of jaws or other working pieces cooperatively connected to each other for effecting scissor movement, and a pair of handles for actuating the jaws, the implement being biased in the open position. The implement has a resilient lock comprising a button compressively joined to a cap, both button and cap being made of yieldable material thereby permitting certain flexing of the button and cap to prevent undesirable sliding of the lock out of its selected position during normal operation of the implement. This novel approach simplifies manufacturing and assembly of the tool and reduces cost without sacrificing quality.

According to another embodiment of the present invention, in a pivoted tool having a pair of elongated members, the pivot member incorporates a self-compensating resilient assembly comprising a resilient button compressively joined to a resilient cap.

According to a preferred embodiment of the present invention, in a pruning shear having two cooperating elongated members, means interconnecting the members in mutually overlapping relationship to permit movement of the members relative to one another by operating the force applying ends of these members, a resilient lock mechanism comprises a resilient cap releasably secured to a resilient button by a fastener.

Other advantages of the present invention will become apparent from the detailed description given hereinafter. It should be understood, however, that the detailed description and specific embodiments are given by way of illustration only since, from this detailed description, various changes and modifications within the spirit and scope of the invention will also become apparent to those skilled in the art.

BRIEF DESCRIPTION OF THE DRAWINGS

The preferred exemplary embodiment of the present invention will hereinafter be described in conjunction with the appended drawings, wherein like numerals denote like elements, and:

FIG. 1 is a side elevation view of a pruning shear according to the present invention in the closed position;

FIG. 2 is a side elevation view of the pruning shear of FIG. 1, shown in the open position;

FIG. 3 is a cross-sectional view taken along line 3—3 shown in FIG. 1; and

DETAILED DESCRIPTION OF A PREFERRED EXEMPLARY EMBODIMENT

Figure 4:
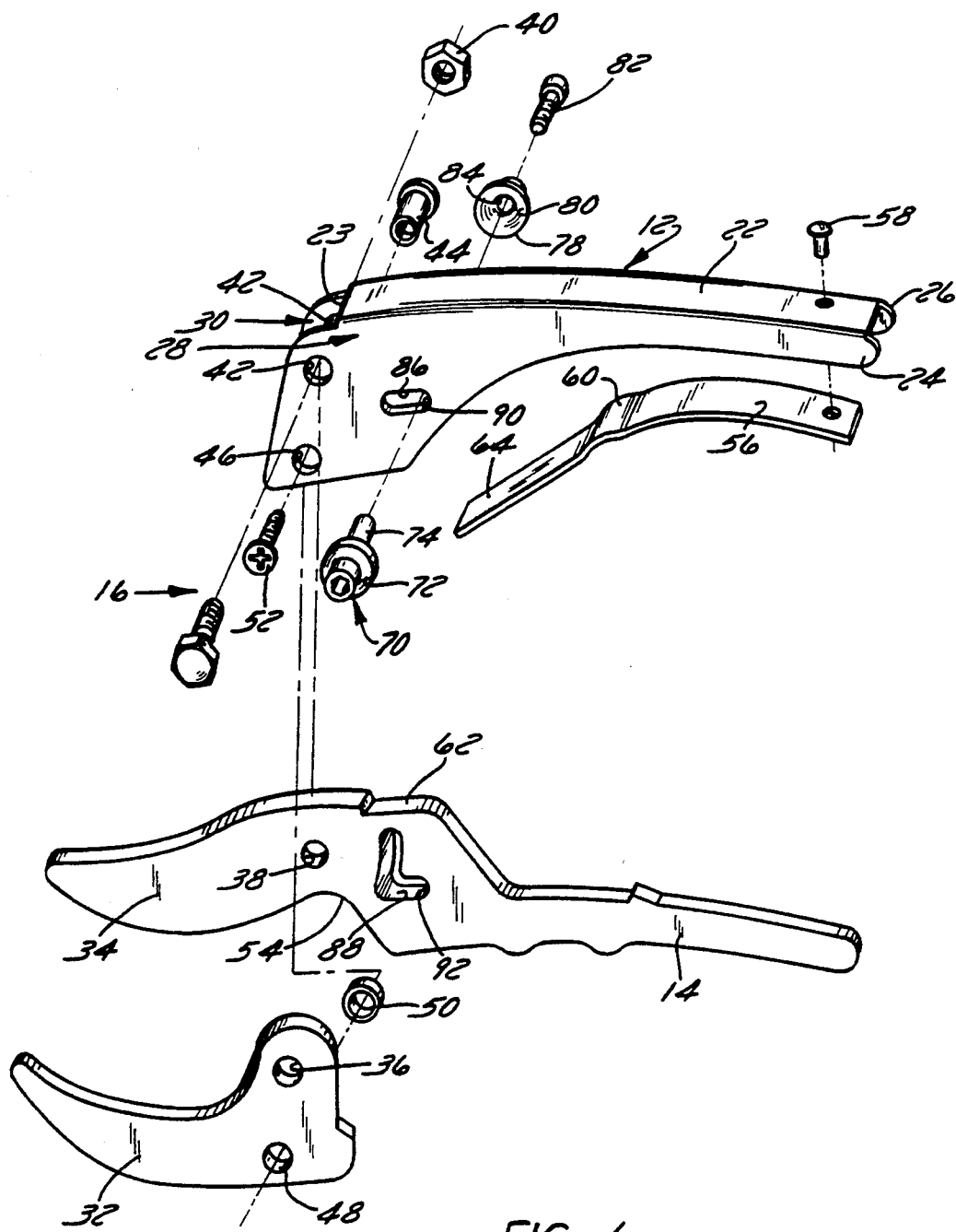
FIG. 4 is an exploded view of the components of the pruning shear shown in FIG. 1.

Referring to the Figures, a pruning shear in accordance with the present invention, designated generally as 10, having a force applying end 10A and an opposed working end 10B, is shown to include an upper elongated member 12 and a lower elongated member 14, pivotally joined by a pivot bolt 16. Members 12 and 14 are being covered by the usual rubber or plastic covering members 18 and 20, respectively.

Referring more particularly to FIG. 4, upper elongated member 12 is channel-shaped, and a web 22 connects respective side panels 24 and 26. Web 22 is generally flat, and includes a substantially straightforward edge 23 disposed proximate pivot bolt 16. Side panels 24 and 26 terminate proximate pivot bolt 16 by cheeks 28 and 30, respectively. Lower elongated member 14 is extendable between opposite cheeks 28 and 30. Cheeks 28 and 30 are also disposed on opposite sides of a lower hook or anvil blade 32 and an adjacent confronting upper cutting blade 34 of lower member 14. As shown in FIG. 4, upper cutting blade 34 and lower elongated member 14 are preferably unitary.

Lower hook or anvil blade 32 is in pivotal relationship with upper cutting blade 34 by pivot bolt 16, which is extendable transversely through opposite cheeks 28 and 30 and through aperture 36 of lower hook or anvil blade 32. Pivot bolt 16 also extends through aperture 38 of upper cutting blade 34. Pivot bolt 16 is secured by pivot nut 40, threaded thereon in known manner. Pivot bolt 16, extended through suitably aligned apertures 42 of cheeks 28 and 30, and apertures 36 and 38 defines a fulcrum on which elongated members 12 and 14 are pivoted.

A lower blade bushing 44 is extendable through suitably aligned aperture 46 of cheek 30 (not shown), spacing collar 50, aperture 48 of lower blade 32, aligned aperture 46 in cheek 28, and lower blade screw 52. Collar 50 is sleeved on bushing 44 between lower blade 32 and cheek 30, distantly thereof to allow a space for the vertical movement of upper blade 34 relative to lower blade 32. Collar 50 also serves as a stop for the open position of the tool, the curvilinear lower face 54 of upper elongated member 14 coming to bear on spacing collar 50.

Relative pivotal movement between, on the one hand, upper blade 34 and unitary lower elongated member 14, and on the other hand, lower blade 32 and upper elongated member 12 fixedly secured thereto, is allowed by pivot bolt 16, so that the blades are actuated by convergence or divergence of members 12 and 14.

A spring actuated biasing means, preset so as to bias blades 32, 34 to open position, is in the form of a leaf spring 56 concealed within upper elongated member 12 and secured at its outer extremity to the inwardly facing surface of web 22 by a leaf spring rivet 58. Leaf spring 56 is ribbed intermediate its extremities at rib 60 to increase the biasing force applied to the cutting blades. Leaf spring 56 rides along a flat 62 on the upper spine of lower member 14. As lower member 14 is brought upwardly relative to upper member 12 by the pressure of the operator's hand, terminal portion 64 of leaf spring 56 is caused to ride along flat 62.

In accordance with the present invention and as best illustrated in FIGS. 3 and 4, a resilient lock generally designated as 68 comprises a button 70 having a resilient cap, which for ease of reference will hereinafter be referred to as head 72, and a shank 74 projecting from head 72. Head 72, which is advantageously circular, has a concavely-shaped (i.e., dish-shaped) face 76. Thus, face 76 is effectively in contact with cheek 28, preferably at the periphery of head 72, along an annular region 79 of face 76, as can readily be seen in FIG. 3. This construction permits a certain degree of flexing of head 72 when suitable compressive force is applied to button 70 along its longitudinal axis (i.e., along an axis drawn horizontally in FIG. 3). As a result, the area of annular region 79, which increases or decreases with such compressive force determines the degree of frictional engagement of face 76 with cheek 28.

Head 72 is also provided with a central driver-engageable recess 77 extending inwardly from the outer surface of head 72. Recess 77 is suitably formed for engagement by a driver tool designed for installation of the lock such as an "Allen" driver. This releasable engagement capability greatly facilitates and renders safer the assembling of lock 68 in tool 10 as production personnel is no longer required to hold button 70 in place while driving it.

Resilient lock 68 also comprises a resilient cap 78, preferably configured like head 72, i.e., dish-shaped, having a generally concavely shaped face 80 adjacent cheek 30. Cap 78 is releasably connected to button 70 by fastener 82 engaging a bore 83 of button 70. A centering recess 84 is advantageously formed in face 80 to matingly receive the free end of shank 74, thereby facilitating assembling and operation of lock 68 as cap 78 remains centered with button 70.

As in the case of button 70, face 80 is effectively in contact with cheek 30, preferably at the periphery of cap 78 along an annular region 85 of face 80, as can also readily be seen in FIG. 3. This construction permits a certain degree of flexing of cap 78 when suitable compressive force is applied to cap 78 along its axis of symmetry (i.e., along an axis drawn horizontally in FIG. 3). As a result, the area of annular region 85, which increases or decreases with such compressive force (adjustable in a simple and inexpensive manner by fastener 82), determines the degree of frictional engagement of face 80 with cheek 30. Thus, the areas of annular regions 79 and 85 cooperate to provide controlled positional retention of lock 68.

The novel configuration of resilient lock 68, as particularly described in the foregoing, permits limited flexing of head 72 and cap 78 in response to rotational adjustment of fastener 82. Such continuous adjustment of frictional engagement of concavely shaped faces 76 and 80 with cheeks 28 and 30, i.e., of the areas of annular regions 79 and 85, respectively, improves, in a relatively inexpensive manner, positional retention of lock 68 during normal operation of tool 10.

As more readily apparent in FIG. 4, to permit locking or unlocking of tool 10, upper member 12 is provided with an elongated slot 86, formed in spaced relationship to aperture 42 through member 12, and extending in a direction generally parallel web 22 (i.e., in a direction parallel the longitudinal axis of tool 10). In addition, lower member 14 has a generally L-shaped slot 88 formed, in spaced relationship to aperture 38, through member 14. As shown in FIG. 3, when tool 10 is in the closed position, elongated slot 86 and the lower portion of L-shaped slot 88 are substantially in registration. Thus, in closed configuration, lock 68 can be slid toward rear terminus 90 of slot 86 and rear terminus 92 of slot 88 to maintain tool 10 closed against the biasing force of spring 56. Conversely, to unlock tool 10, lock 68 is moved toward front terminus (not identified) of slots 86, 88, thereby allowing lower member 14 to pivot around pivot 16 into the open position. In both instances, due to the resilient construction of lock 68, desired positional location of lock 68 is effectively maintained.

In addition to improving positional retention without requiring numerous parts, lock 68 also presents other advantages. In particular and significantly, the substantially identical configuration of head 72 and cap 78 permits ambidextrous operation of tool 10. In addition, head 72 and cap 78 being advantageously circular, the assembly of lock 68 in tool 10 does not necessitate rotational orientation of button 72 or cap 78 with respect to cheeks 28 and 30. Moreover, lock 68 which is preferably made of a self-lubricating resilient material such as nylon 66, is relatively inexpensive to manufacture.

In accordance with a second exemplary embodiment of the present invention, and as readily apparent to those skilled in the art, lock 68 could also be used as the pivot of a pair of scissors comprising a pair of elongated members disposed for cooperative engagement about a pivotable joint. In that second embodiment, the joint consists of a resilient button 70 and a cap 78 releasably connected thereto by a fastener 82. In particular, pivot bolt 16 can be constructed using resilient lock 68 of suitable size, thereby permitting self-compensation of wear in the pivot developed by repeated operation of tool 10.

It is understood that the above description is of preferred exemplary embodiments of the present invention and that the invention is not limited to the specific forms described herein. For example, tools having this novel resilient lock mechanism may not have a pair of elongated members as described herein. Each of such elongated members may be formed in one piece having spaced apart inner and outer surfaces, or having working surfaces other than cutting blades. These members may also be hingedly connected as opposed to forming a pivot as described in the preferred embodiments. Moreover, even though the embodiments shown in the Figures are the preferred embodiments, it is to be noted that this invention, which is based on tools having a resilient lock mechanism or a resilient pivot wherein the lock or pivot is comprised of a resilient button compressively joined to a resilient cap, can be carried out in other manners. For example, head 72 and cap 78 need not be of identical configuration or need not have recesses or apertures as disclosed herein. Conversely, button 70 could include only head 72, compressively joined to cap 78 by means other than those described in the preferred embodiments. However, such other constructions and features are considered to be within the scope of this invention. Accordingly, these and other substitutions, modifications, changes and omissions may be made in the design and arrangement of the elements disclosed herein without departing from the scope of the appended claims.

We claim:

1. A hand tool comprising:
   first and second working pieces disposed for cooperative engagement about a pivot point;
   first and second members secured to a respective one of said working pieces and resiliently biased to an open position, said members having respective first and second slots formed therethrough and being substantially in registration when said working pieces are in closed position; and
   a resilient lock slidable within said slots for securing said working pieces in said closed position, said lock including a button having a head merging into a shank extending through said slots, said button being made of a yieldable material, said lock further including a cap joined to said button by said shank,
   wherein said head and said cap each have an engageable surface and a face, said face being concavely shaped so that said head and said cap are effectively in contact with said tool in a respective annular region of each of said faces, and further wherein the area of said regions is proportional to the degree of compressive force applied to said lock, thereby determining the degree of frictional, locking, engagement of said faces with said tool.

2. The tool of claim 1 wherein said shank has a bore, and said lock further comprises a fastener engaging said bore to permit adjustment of the degree of frictional, locking, engagement of said faces with said tool.

3. The tool of claim 1 wherein the engageable surface of said head comprises a central driver-engageable recess suitably formed for engagement by a driver tool.

4. The tool of claim 1 wherein the face of said cap has a centering recess matingly engaging the free end of said shank.

5. The tool of claim 1 wherein the head of said button and said cap are substantially identically shaped thereby permitting a user to activate the lock with either hands with equal facility.

6. The tool of claim 1 wherein said head and said cap are substantially circular thereby permitting installation of said lock within said slots without rotational orientation of said head and said cap with respect to said axis.

7. The tool of claim 1 wherein said button and said cap are made out of nylon.

8. The tool of claim 2 wherein said pivot point is comprised of said button, said cap, and said fastener.

9. The tool of claim 1 wherein said first handle is channel-shaped straddling the working pieces.

10. The tool of claim 9 wherein said second handle is unitary with said second working piece.

11. The tool of claim 1 wherein said first slot is an elongated slot formed in spaced relationship to said pivot and substantially parallel to the longitudinal axis of said tool, and said second slot is substantially L-shaped, the lower portion of said L-shaped slot being substantially parallel to said axis when said tool is in closed position.

12. A resilient lock for securing together a pair of cooperatively-engaging pivoted elongated members, said lock comprising:
   (a) a resilient button having a head, disposed adjacent the outer surface of one of said members, and a shank projecting from said head and extending through a pair of lock-receiving slots formed in a respective one of said members in spaced relationship to the pivotal area, said shank further including a bore, said head having an engageable surface and a face, said face being concavely shaped so that said head is effectively in contact with said one of said members in an annular region of said face; and
   (b) a cap having a concavely shaped face so that said cap is effectively in contact with the other of said members in an annular region of said cap face, said cap being made of a yieldable material, said cap being compressively joined to said button by a fastener engaging said bore to permit adjustment of the compressive force applied to said lock and thereby determine the degree of frictional, locking, engagement of said faces with said outer surfaces.

13. A hand tool having a force applying end and an opposed working end disposed across a joint through which a force may be transmitted, said tool being resiliently biased to an open position, wherein said tool comprises:
   first and second elongated members disposed for cooperative engagement about said joint, said members having a respective inner surface, spaced apart outer surface, and slot formed therethrough in spaced relationship to said joint, said slots being substantially in registration when said tool is in closed position; and a resilient lock slidable within said slots for securing said tool in said closed position, said lock including opposed, dish-shaped caps with concave faces, wherein said caps are made of a resilient material and are compressively joined to engage said outer surfaces in a respective annular region of each of said faces, the area of said regions being proportional to the degree of compressive force applied to said lock, thereby determining the degree of frictional, locking, engagement of said faces with said outer surfaces.

14. A tool having a force applying end and an opposed working end disposed across a pivotable joint through which a force may be transmitted, wherein said tool includes first and second elongated members disposed for cooperative engagement about said pivotable joint, each of said members having an inner surface and a spaced apart outer surface, and further wherein said joint is comprised of:

(a) first and second registering apertures, one of each formed in a respective one of said elongated members; and (b) a resilient pivot passing through said apertures, said pivot including a button having a head merging into a shank extending through said apertures, said button being made of a yieldable material, said pivot further including a cap joined to said button by said shank, wherein said head and said cap are substantially identical and each have an engageable surface and a face, said face being concavely shaped so that said head and said cap are effectively in contact with said tool in a respective annular region of each of said faces, the area of said regions being proportional to the degree of compressive force applied to said pivot, thereby maintaining suitable frictional engagement of said faces with said outer surfaces.

* * * * *